K. W. ROCKENHAUSER & H. F. FISCHER.
LATHE HEAD.
APPLICATION FILED SEPT. 28, 1908.

929,789.

Patented Aug. 3, 1909.
8 SHEETS—SHEET 1.

K. W. ROCKENHAUSER & H. F. FISCHER.
LATHE HEAD.
APPLICATION FILED SEPT. 28, 1908.

929,789.

Patented Aug. 3, 1909.
8 SHEETS—SHEET 4.

K. W. ROCKENHAUSER & H. F. FISCHER.
LATHE HEAD.
APPLICATION FILED SEPT. 28, 1908.

929,789.

Patented Aug. 3, 1909.
8 SHEETS—SHEET 5.

UNITED STATES PATENT OFFICE.

KARL WILHELM ROCKENHAUSER, OF NEW YORK, AND HENRY F. FISCHER, OF CORONA, NEW YORK, ASSIGNORS TO P. PRYIBIL ESTATE, OF NEW YORK, N. Y.

LATHE-HEAD.

No. 929,789.    Specification of Letters Patent.    Patented Aug. 3, 1909.

Application filed September 28, 1908. Serial No. 455,086.

*To all whom it may concern:*

Be it known that we, KARL WILHELM ROCKENHAUSER and HENRY F. FISCHER, citizens of the United States, residing, respectively, in the borough of Manhattan, city, county, and State of New York, and at Corona, Queens county, State of New York, have invented certain new and useful Improvements in Lathe-Heads, of which the following is a specification.

Our invention is designed to afford a perfectly balanced lathe head or attachment adapted to be operated at a relatively high degree of speed, and to turn or spin both elliptical and circular outlines, as hereinafter set forth.

A distinguishing feature of the invention is the duplication of parts diametrically opposed to each other on the lathe head, to balance and neutralize the effect of centrifugal force, whereby the lathe head can be safely rotated at a much higher speed than has heretofore been practicable, thereby attaining economy of time and labor and affording a superior superficial finish of work.

Another important feature is the provision of means whereby the outline may be varied from a circle to any desired form and size of ellipses, within the capacity of the machine, without stopping or slowing the operation.

The invention also includes certain other features in the construction and arrangement of parts hereinafter described and claimed specifically.

In the accompanying drawings, Figure 1, is a plan of our improved lathe head; Fig. 2, a side elevation; Fig. 3, a front view, Fig. 4, an edge view and Fig. 5, a rear view of one of the front guide plates; Fig. 6, a front view, Fig. 7, an edge view, and Fig. 8, a rear view of one of the rear guide plates; Fig. 17, is a sectional elevation upon plane of line 17—17—Fig. 9; Fig. 18, is an elevation, Fig. 19, an edge view, and Fig. 20 an end view of one of the wrist pin slides; Fig. 21, is a front view, Fig. 22, an edge view and Fig. 23 a rear view of one of the crank arms; Fig. 24, is a front elevation, and Fig. 25 an end elevation of one of the crank arms with the wrist slide in position; Fig. 26, is a detail view of one of the adjusting screws; Fig. 32, a front elevation, Fig. 33, an edge view, Fig. 34, a rear elevation, and Fig. 35, a top view of the rear slide; Figs. 36 and 37, front and rear elevations of one of the gibs; Fig. 38, an edge view of the same.

The power shaft P, is mounted in a bearing $b$, of usual construction, on the standard B. The shaft is held against longitudinal movement in the bearing by the hub $p$, of the driving gear at the rear of the bearing $b$, and by the annular collar $p'$, on the shaft itself, which collar rests against the front of the bearing $b$.

Figure 39:
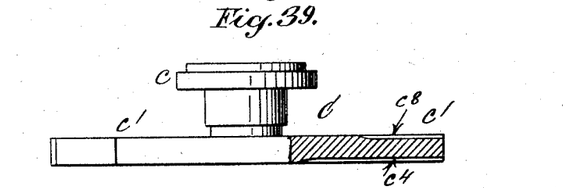
Fig. 39, a top view partly in section of the cross head.
Figure 40:
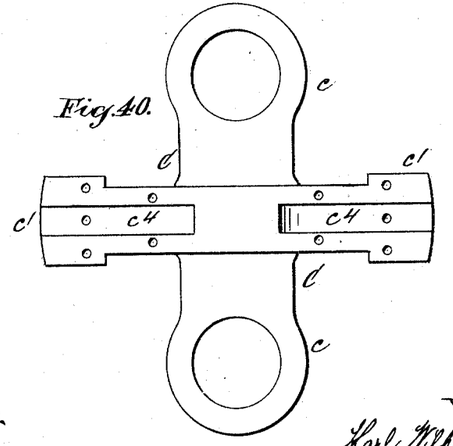
Fig. 40, a front elevation of the cross head.

Rigidly secured to the front end of the power shaft P, is the cross head C, shown in detail in Figs. 39 and 40. In the drawings the cross head C, is shown as screwed onto the threaded front end of the power shaft P, but this is not material, the essential feature being a means of attachment between the parts that will insure the rotation of the cross head C, with the shaft P. The cross head C is formed at the rear with the diametrically opposed radial gear hangers $c$, $c$, which occupy the same plane, and upon which the main gearing is mounted. It is also formed in front with the diametrically opposed arms $c'$, $c'$, which support the slide mechanism. These arms $c'$, $c'$, occupy the same plane, and extend at right angles to the gear hanger arms $c$, $c$.

Figure 11:
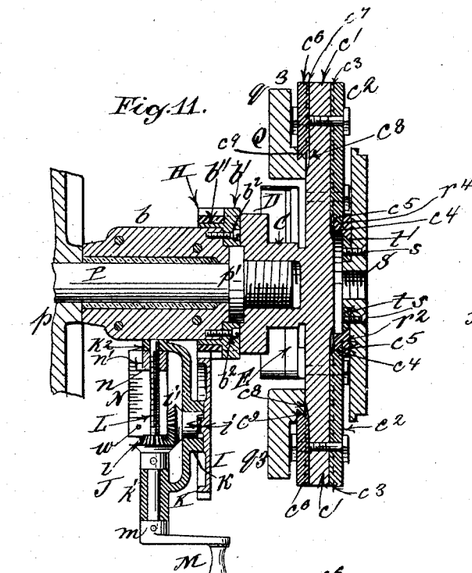
Fig. 11, is a horizontal sectional elevation upon plane of line 11, 11—Fig. 9.

Rigidly attached to the face of the bearing $b$, and concentric therewith, is the stationary gear $b'$. In Fig. 11, it is shown as secured to the bearing by means of screws $b^2$, although any other mechanical expedient may be resorted to. Meshing with the central stationary gear $b'$, are the crank gears $a$, $a$. These crank gears $a$, $a$, are rigidly attached to the rear of the hubs $d$, $d$, of the crank arms D, D, by screws $d'$, $d'$, as shown in Figs. 12, 14, 16 and 17, or by other suitable means. The hubs $d$, $d$, of the crank arms D, D, are mounted in bushings $c^{22}$, $c^{22}$, secured in and to the hanger arms $c$, $c$, as will be seen by reference to said figures of the drawings. These crank arms D, D, are shown in detail in Figs. 21 to 23 inclusive. The crank wrists $e$, $e$, are mounted adjustably upon the crank arms D, D. To this end, the wrists $e$, $e$, form parts of slides E, E, which have grooves $e'$, $e'$, on their rear side for engagement with parallel ways $d^2$, $d^2$, on the face of the crank arms D, D. The adjustment of the crank wrists $e$, $e$, is effected by means of screws $f$, $f$, which engage female screws in the slides E, E, and are mounted on the crank arms D, D, and actuated through the medium of the gears $g$, $g$, H, I, by the setting mechanism J. To accomplish this the shanks $f'$, $f'$, of the screws $f$, $f$, may be formed with shoulders $f^2$, $f^2$, and be seated in bearings $d^3$, $d^3$, in the faces of the crank arms D, D, being secured thereon by caps $d^4$, $d^4$; and the screws $f$, $f$, are also provided with bevel gears $f^3$, $f^3$, which mesh with the bevel gears $g^2$, $g^2$, secured to the hubs $g^{22}$, $g^{22}$, of the thrust gears $g$, $g$, as will be understood by reference to Figs. 12, 14 and 17, in which it will be seen that each bevel gear $g^2$ is formed with a stud $g^3$, seated in the hub $g^{22}$, of the wheel $g$, and is bound to said hub $g^{22}$, by a nut $g^4$, engaging the threaded end of said stud. The slots $e^2$, $e^2$, in the slides E are to afford clearance for the bevel gears $f^3$, $f^3$.

The spur gear H, is mounted loosely on the hub $b''$, of the central stationary gear $b'$, as indicated in Figs. 11, 15, 16 and 17, so as to be free to rotate independently as an idler to transmit the motion of the setting mechanism. It is held in place by the gear $b'$, on one side and the face of the bearing $b$, on the other. The setting wheel I, with which the idler H meshes, is secured to the hub $i$, of the bevel gear $i'$, said hub being mounted in a bearing $k$, on the bracket K, attached to the standard B, or other stationary support.

Figures 1, 3, 4, 5:
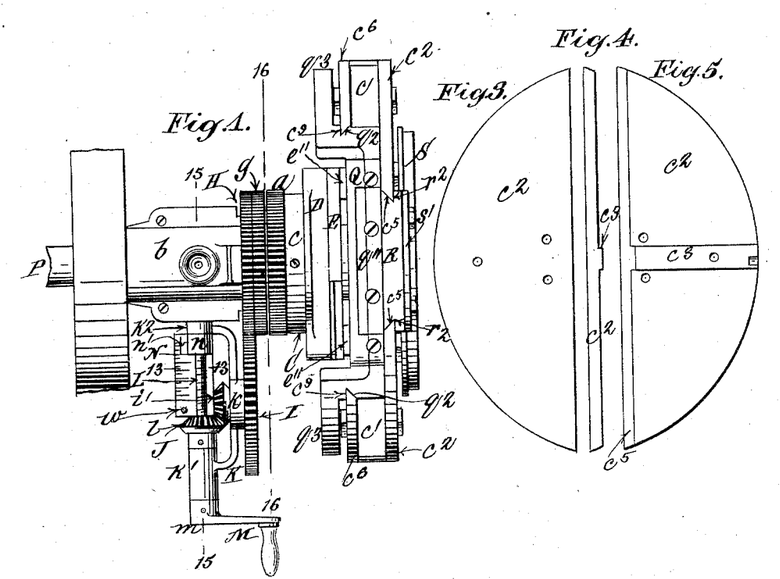
Figure 12:
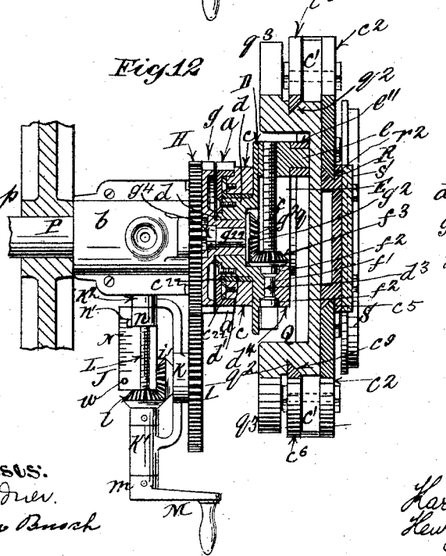
Fig. 12, is a horizontal sectional elevation upon plane of line 12—12—Fig. 2.
Figure 13:
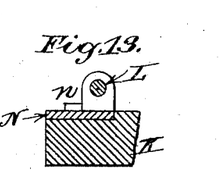
Fig. 13, is a sectional detail upon an enlarged scale, on plane of line 13—13—Fig. 1.
Figure 14:
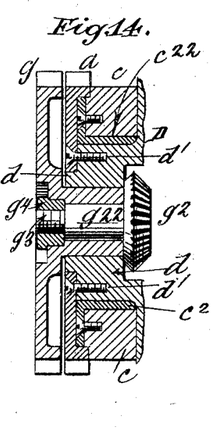
Fig. 14, is a partial sectional detail upon an enlarged scale taken upon the same plane as Fig. 12.
Figure 15:
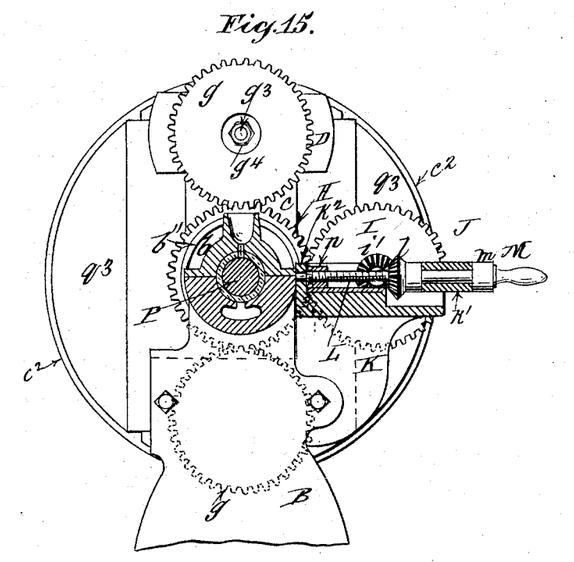
Fig. 15, is a sectional elevation taken upon plane of line 15—15—Fig. 1; looking forward.
Figure 16:
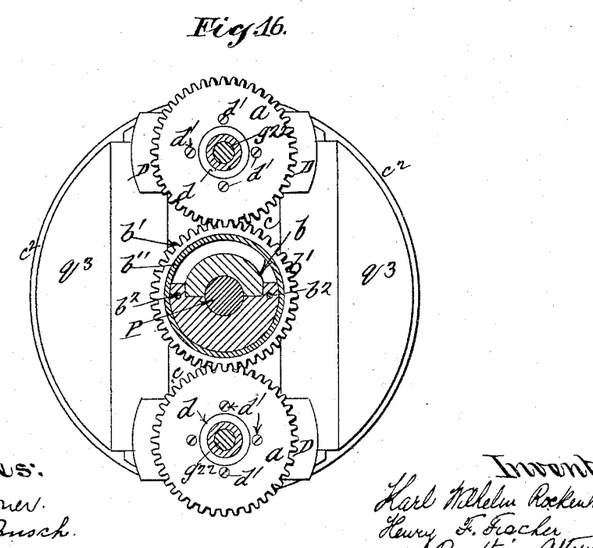
Fig. 16, is a sectional elevation on plane of line 16—16—Fig. 1, looking forward.

The bevel gear $i'$, engages with a corresponding gear $l$, on the shank of the screw L, mounted in the bearing $k'$, on the bracket K, see Figs. 1, 12 and 15. The screw L, is held against longitudinal movement by the hub of the bevel gear $l$, on one side of the bearing $k'$, and by the hub $m$, of the crank M, on the other side of said bearing. The inner end of the screw is supported in a bearing $k^2$, on the bracket K. $n$, is a traveling pointer on the screw L, which indicates on the scale N, the degree of eccentricity, if any, to which the work platen S, is adjusted, with relation to the axis of the power shaft P. The under side of the indicator $n$, is flat, and rests upon the upper surface of the scale plate N, as shown in Fig. 13, so that the indicator slides over the scale without turning on the screw. The wrist pins $e$, $e$, engage with slide blocks $e''$, $e''$, resting respectively between the parallel ways $q$, $q'$, on the rear slide Q, and $r$, $r'$, on the front slide R, Figs. 10, 12 and 41.

Both the front and rear slides Q and R, are mounted upon the forward arms $c'$, $c'$, of the cross head C. The front or work supporting slide R is shown in detail in Figs. 27, 28, 29, 30 and 31. The front slide R is retained upon the front side of the arms $c'$, $c'$, of the cross head C by front guide plates $c^2$, $c^2$, (Figs. 3, 4 and 5) formed with tenons $c^3$, $c^3$, which fit in the radial slots $c^4$, $c^4$, of the arms $c'$, $c'$, and with beveled edges $c^5$, $c^5$, which engage the correspondingly beveled longitudinal edges $r^2$, $r^2$, on the slide R, as shown in Figs. 1, 11 and 12.

Figures 2, 6, 7:
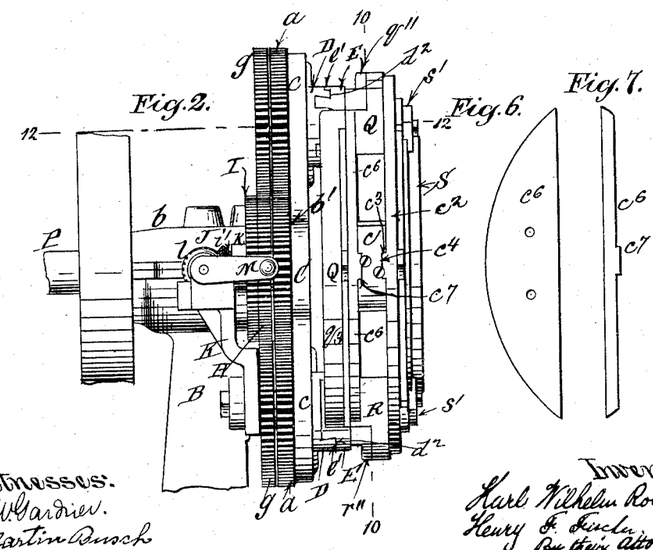
Figure 8:
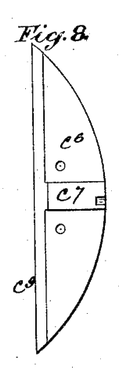
Figure 9:
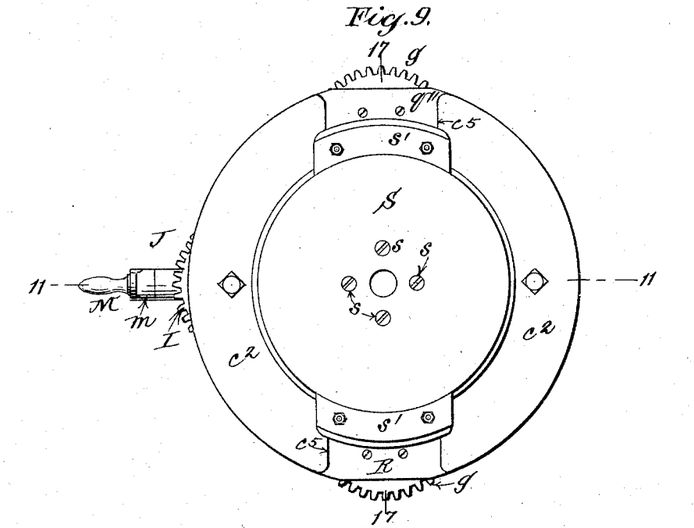
Fig. 9, is a front elevation of our improved lathe head.
Figure 10:
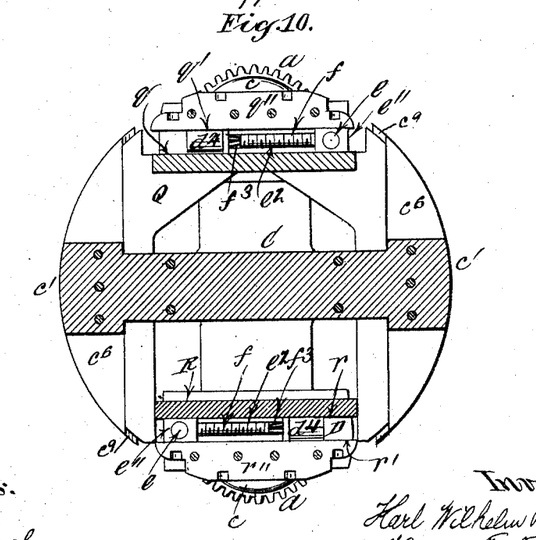
Fig. 10, a sectional elevation upon plane of line 10—10—Fig. 2.
Figure 41:
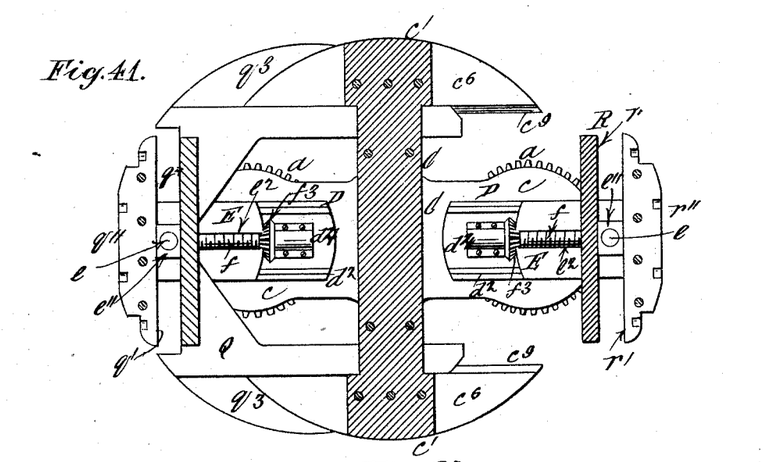
Fig. 41, a view on the same plane as Fig. 10, showing the maximum of thrust.

The ways for one of the sliding blocks $e''$, are formed by the transverse shoulders $r$, forming part of the slide R, while the opposed way is formed by the edge $r'$, of the gib $r''$, which is screwed to the outer end of said slide R, Figs. 10, 11 and 41. The rear slide Q is retained upon the rear side of the radial arms $c'$, $c'$, of the cross head C by rear guide plates $c^6$, $c^6$, (Figs. 6, 7 and 8) formed with tenons $c^7$, $c^7$, which fit in the radial slots $c^8$, $c^8$, (Figs. 2, 11 and 39) in said radial arms $c'$, $c'$, and with beveled edges $c^9$, $c^9$, which engage the correspondingly beveled longitudinal edges $q^2$, $q^2$, of the slide Q. The ways for the other sliding block $e''$, are formed by the transverse shoulder $q$, forming part of the slide Q, while the other opposed way is formed by the edge $q'$, of the gib $q''$, secured to the outer end of the slide Q, Figs. 10, 17 and 41. This inner slide Q is formed with the parallel wings $q^3$, $q^3$, which act as counterweights to balance the centrifugal force exerted by the work on the slide.

Figures 17, 18, 19, 20, 21, 22, 23, 24, 25, 26:
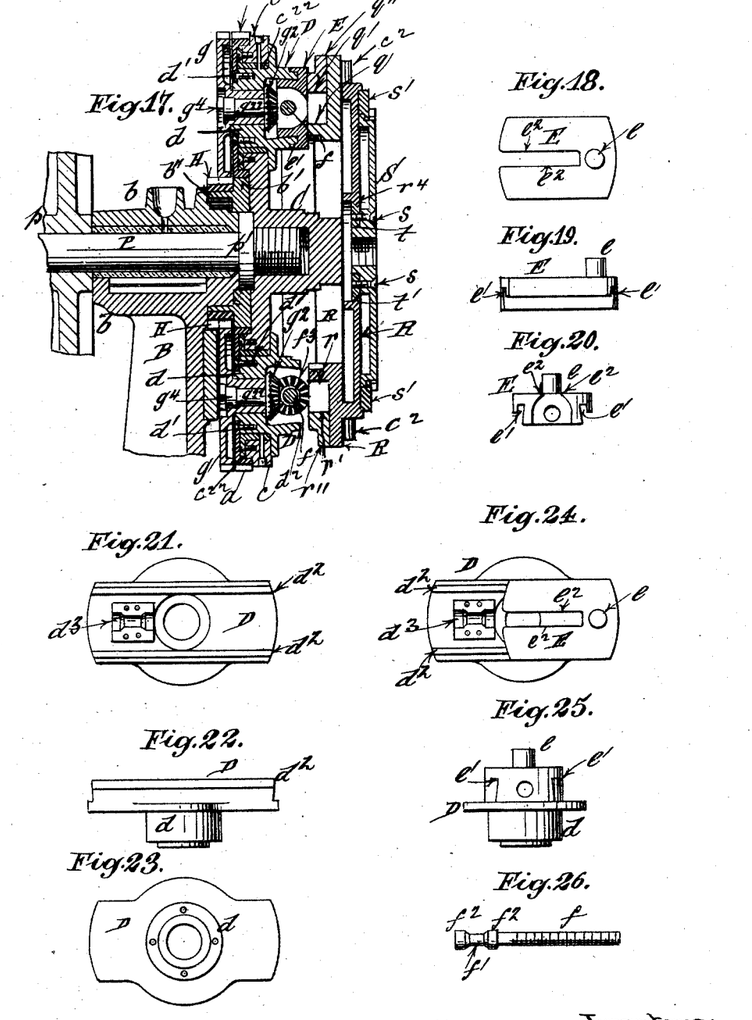
Figure 27:
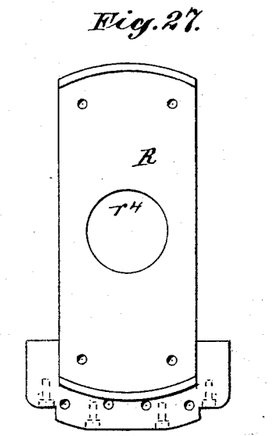
Fig. 27, a front elevation, Fig. 28, an edge view, Fig. 29, a rear elevation, Fig. 30, a top view and Fig. 31, a view of the underside of the front slide.
Figure 28:
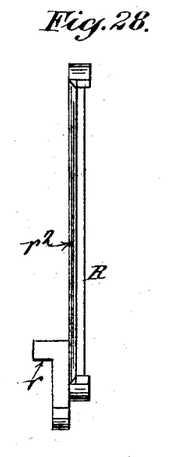
Figure 29:
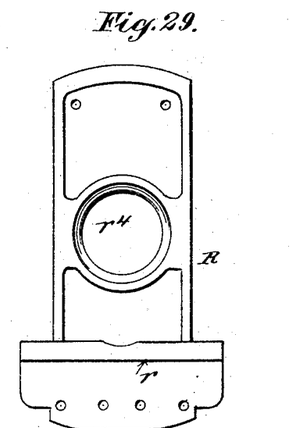
Figures 30, 31, 32, 33, 34, 37, 38:
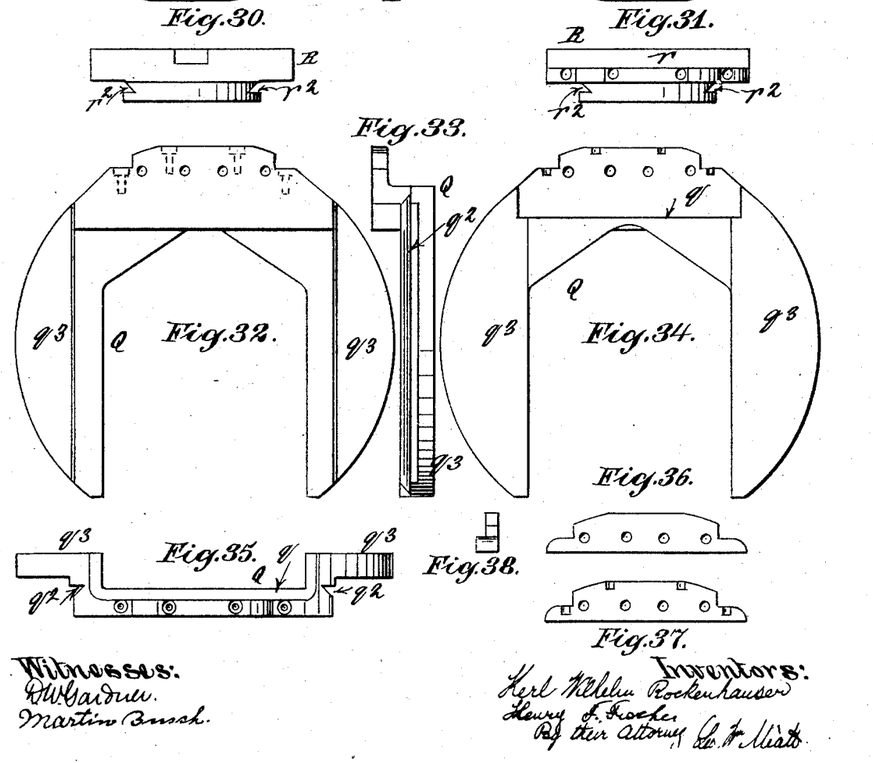
Figure 42:
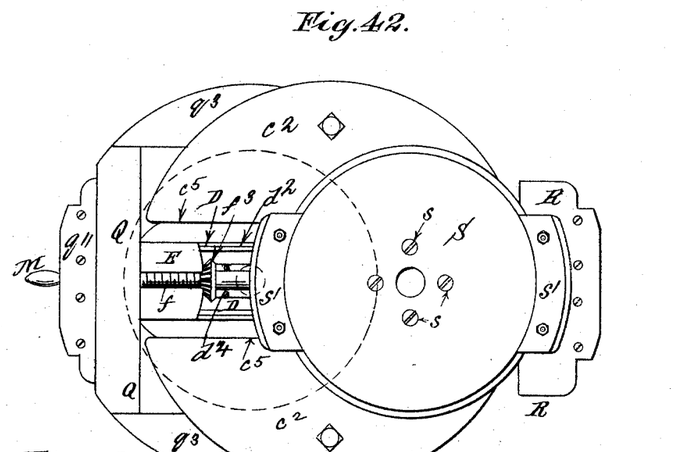
Fig. 42, is a view similar to Fig. 9, showing the maximum of thrust.

The blank to be operated upon is secured to the front slide R, by any suitable mechanical expedient, according to the work to be done, whether turning or spinning. As shown in the drawings, a circular platen S, is secured to the face of the slide R, by screws $s$, $s$, passing through the platen S, and engaging a ring $t$, having a beveled edge $t'$, which contacts with the correspondingly beveled edge of a central aperture $r^4$, in the slide R, as shown in Figs. 11, and 17. This construction is for the purpose of centralizing the platen with accuracy. The platen S is further held to the slide R by means of caps $s'$, $s'$, overlapping its edges, Figs. 1, 2, 9, 12 and 17. The platen S, is tapped centrally for the reception of the threaded end of a nipple, arbor, or the like. It is obvious that the platen as a separate piece may be dispensed with and the face of the slide adapted to receive and support the blank if desired, without departing from the spirit and intent of our invention. In all but Figs. 41 and 42 the parts, for convenience of drawing, are shown in the intermediate position, with the center of the work platen S, coinciding with the axis of the power shaft P, although the crank wrists $e$, $e$, are set at the full extent of thrust, as shown in said Figs. 41 and 42.

Figures 43, 44, 45:
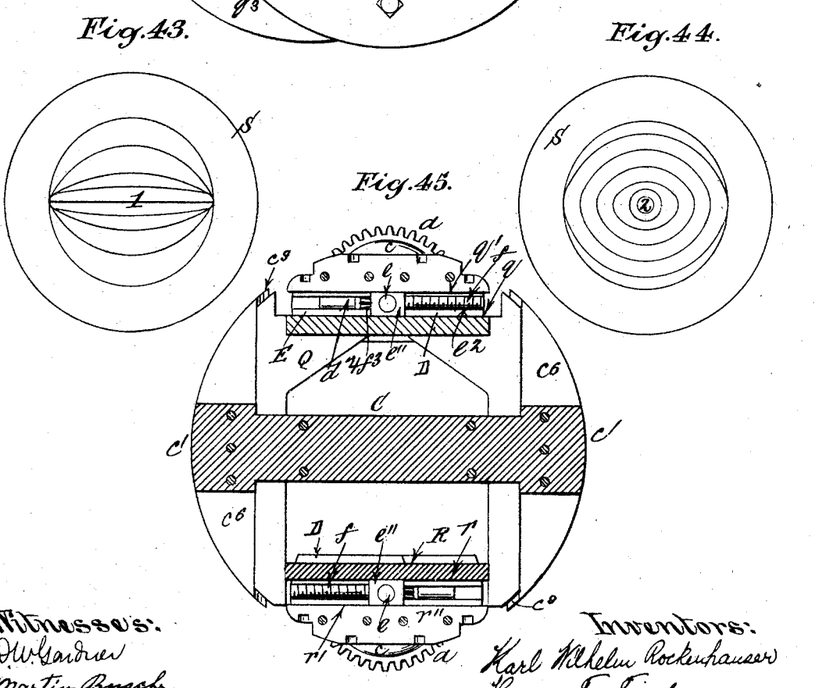
Figs. 43 and 44, are views illustrating diagrammatically outline effects attainable by means of our improved mechanism.
Fig. 45, a view similar to Fig. 10, showing the parts set at zero.

In Fig. 45 the axis of the platen S and of the power shaft P coincide because the crank wrists are set at zero,—i. e. with their centers in coincidence with the axes of their crank hubs, in which position obviously there will be no lateral thrust, and a tool held on one side of said axial center of the power shaft will describe a circle on the work mounted on the platen,—the diameter of such circle being twice the radial distance between said center and the end of the tool. Thus as set in said Fig. 45, circles of any diameter within the limits of the machine may be described. When the device is thus set at zero, as in Fig. 45, the indicator $n$, rests against a stop $w$, shown in Figs. 1, 11 and 12, with its pointer $n'$, on the first line on the scale N. By turning the crank M so as to advance the indicator $n$, along the scale, the bevel gear $l$, is made to rotate the bevel gear $i'$, and setting wheel I, thereby in turn rotating the idler H, which transmits the motion to the thrust gears $g$, $g$, and $g^2$, $g^2$, and by means of the latter to the bevel gears $f^3$, $f^3$ on the screws $f$, $f$. As a result the screws $f$, $f$, advance the wrist slides E, E, along the crank arms D, D, and away from the axes of the crank arm hubs, so that the wrist pins $e$, $e$, acting through the wrist blocks $e''$, $e''$, will advance and retract the slides Q and R, twice at each revolution of the power shaft, and the crank arms D, D, being arranged in opposite direction the reciprocal movements of said slides Q and R, will be in opposite directions with relation to each other, but uniformly so, so as to counterbalance and neutralize centrifugal force. In this connection, it will be seen by reference to Fig. 15, that the idler H rotates the thrust gears $g$, $g$, and by reference to Fig. 16, that the crank gears $a$, $a$, being mounted on the cross head C, revolve around the power shaft P and are rotated on their axes by reason of their engagement with the stationary gear $b'$. Thus, unless the axes of the wrists $e$, $e$, are retracted with their axes in coincidence with those of the crank arm hubs $d$, $d$, as hereinbefore mentioned, each crank will reciprocate its slide with a length of thrust determined by the advance adjustment of the setting mechanism J, and this adjustment may be effected with accuracy by aid of the indicator $n$, and scale N, even while the apparatus is running at maximum speed. By thus providing for variations in lateral thrust during the rotation of the lathe head, we attain many practical and important advantages, such as economy in time and labor of manipulation, increase of output, superiority of finish etc. Furthermore, as indicated diagrammatically in Figs. 43 and 44, the variations of size and shape of outline attainable are limited only by the size and capacity of the lathe head, in that variations may be had from a circle of any size to a straight line. Thus, supposing the tool to be held at the axis of rotation when the parts are set for lateral thrust, it is obvious that, as at 1 Fig. 43, a straight line will be described equal in length to the full lateral thrust; and departing from this line, elliptical outlines of various and any desired degree of minimum axis may be attained; or, starting from a circular outline, as 2 Fig. 44, elliptical outlines of any desired maximum axis within the limit of adjustment of thrust may be attained. This coupled with the fact that all this may be accomplished while the lathe head is rotating at full speed, enables us to attain work effects heretofore impossible on a lathe, such, for instance, as regular or variable spiral convolutions, blending variations from circular to elliptical outline, or vice versa, elliptical conical work, and so on indefinitely. And all this may be accomplished perfectly and at a high rate of speed because our lathe head is accurately counterbalanced by our system of duplication and opposition of parts and weight.

It is to be understood that the term lathe head is used in a general sense, and that our device may be applied to any rotatable spindle machine for any purpose desired.

What we claim as our invention and desire to secure by Letters Patent is,

1. In a lathe head of the character designated, the combination of two opposed counterweight slides, means for supporting the work on one of them, and thrust cranks so constructed and arranged as to simultaneously reciprocate said slides in opposite directions, for the purpose described.

2. In a lathe head of the character designated, the combination of two opposed counterweight slides, means for supporting the work on one of them, and thrust cranks so constructed and arranged as to simultaneously reciprocate said slides in opposite directions, and means for simultaneously adjusting the throw of said cranks, for the purpose described.

3. In a lathe head of the character designated, the combination of two opposed counterweight slides, means for supporting the work on one of them, thrust cranks arranged to simultaneously reciprocate said slides in opposite directions, and means for simultaneously adjusting the wrists of said cranks upon their crank arms and with relation to the crank axes, for the purpose described.

4. In a lathe head of the character designated, the combination of two opposed counterweight slides, means for supporting the work on one of them, thrust cranks arranged to simultaneously reciprocate said slides in opposite directions, gears on the hubs of said thrust cranks, and a stationary gear engaging with said crank gears and concentric with the line of axial rotation of the lathe head, for the purpose described.

5. In a lathe head of the character designated, the combination of two opposed counterweight slides, means for supporting the work on one of them, thrust cranks arranged to simultaneously reciprocate said slides in opposite directions, gears on the hubs of said cranks, a stationary gear engaging with said crank gears and concentric with the line of axial rotation of the lathe head, journals mounted concentrically in the hubs of said thrust cranks, bevel gears on the front of said journals, engaging with bevel gears on adjusting screws mounted on the crank arms, said adjusting screws and gears, wrist slides on said adjusting screws, gears on the said journals engaging with an idler concentric to the axis of rotation of the lathe head, and setting mechanism for turning said idler, for the purpose described.

6. In a lathe head of the character designated, the combination of two opposed counterweight slides, means for supporting the work on one of them, thrust cranks arranged to simultaneously reciprocate said slides in opposite directions, gears on the hubs of said cranks, a stationary gear engaging with said crank gears and concentric with the line of axial rotation of the lathe head, journals mounted concentrically in the hubs of said thrust cranks, bevel gears on the front of said journals, engaging with bevel gears on adjusting screws mounted on the crank arms, said adjusting screws and gears, wrist slides on said adjusting screws, gears on the rear of said journals engaging with an idler concentric to the axis of rotation of the lathe head, a setting wheel engaging said idler, a bevel gear on the journal of said setting wheel, a bevel gear engaging therewith and mounted on a hand shaft, and said hand shaft, for the purpose described.

7. In a lathe head of the character designated, the combination of two opposed counterweight slides, means for supporting the work on one of them, thrust cranks arranged to simultaneously reciprocate said slides in opposite directions, gears on the hubs of said cranks, a stationary gear engaging with said crank gears and concentric with the line of axial rotation of the lathe head, journals mounted concentrically in the hubs of said thrust cranks, bevel gears on the front of said journals, engaging with bevel gears on adjusting screws mounted on the crank arms, said adjusting screws and gears, wrist slides on said adjusting screws, gears on the rear of said journals engaging with an idler concentric to the axis of rotation of the lathe head, a setting wheel engaging said idler, a bevel gear on the journal of said setting wheel, a bevel gear engaging therewith and mounted on a hand shaft, said hand shaft formed with a screw thread, a traveling indicator on said screw thread, and a stationary scale adjacent to said screw thread, for the purpose described.

8. In a lathe head of the character designated, the combination of a double cross head secured to the power shaft and having two sets of radial arms, one set at right angles to the other, two opposed counterweight slides mounted upon one set of said radial arms, and two thrust cranks mounted on the other set of said radial arms and arranged to engage with and operate said counterweight slides, gears upon the hubs of said thrust cranks, and a stationary gear meshing with said crank gears and concentric to the axis of the power shaft, for the purpose described.

9. In a lathe head of the character designated, the combination with the power shaft of a double cross head secured rigidly to the power shaft and having two sets of radial arms, one set at right angles to the other, two opposed counterweight slides mounted upon one set of said radial arms, and two thrust cranks mounted on the other set of said radial arms, and arranged to engage with and operate said counterweight slides, gears upon the hubs of said thrust cranks, a stationary gear meshing with said crank gears and concentric to the axis of the power shaft, and means for adjusting the positions of the wrist pins on the crank arms, for the purpose described.

10. In a lathe head of the character designated, the combination with the power shaft of a double cross head secured rigidly to the power shaft, and formed with two sets of radial arms, one set at right angles to the other, two opposed counterweight slides mounted upon one set of said radial arms, two thrust cranks mounted on the other set of radial arms, the wrist pins of said cranks arranged to engage with and actuate said counterweights, and means for rotating said cranks by the motion of the lathe head, for the purpose described.

11. In a lathe head of the character designated the combination with the power shaft of a double cross head secured rigidly to the power shaft, and formed with two sets of radial arms, one set at right angles to the other, two opposed counterweight slides mounted upon one set of said radial arms, two thrust cranks mounted on the other set of radial arms, the wrist pins of said cranks arranged to engage with and actuate said counterweights, means for rotating said cranks by the motion of the lathe head, and means for simultaneously adjusting the wrist pins upon the crank arms, for the purpose described.

12. In a lathe head of the character designated, the combination with the power shaft of a double cross head secured rigidly to the power shaft and formed with two sets of radial arms, one set at right angles to the other, two opposed counterweight slides mounted upon the forward set of radial arms, two thrust cranks mounted upon the other set of said radial arms, wrist pins on the crank arms engaging with slide blocks resting between transverse ways on said counterweight slides, means for adjusting said wrist pins simultaneously on their crank arms, and means for rotating said cranks by the rotation of the lathe head, for the purpose described.

13. In a lathe head of the character designated, the combination with a power shaft of a double cross head secured rigidly to the power shaft formed with two sets of radial arms, one set at right angles to the other, two opposed counterweight slides mounted upon the forward set of radial arms, two thrust cranks mounted upon the other set of said radial arms, wrist pins on the crank arms engaging slide blocks resting between transverse ways on the said counterweight slides, adjusting screws upon the crank arms engaging the wrist pin blocks, means extending through the axes of the crank hub for turning said adjusting screws simultaneously, and means for rotating said cranks by the rotation of the lathe head, for the purpose described.

14. In a lathe head of the character designated, the combination with the power shaft of a double cross head secured rigidly to the power shaft and formed with two sets of radial arms one set at right angles to the other, two opposed counterweight slides mounted upon the forward set of said radial arms, two thrust cranks mounted upon the other set of said radial arms, wrist pins on the crank arms engaging slide blocks resting between transverse ways on the said counterweight slides, adjusting screws upon the crank arms engaging the wrist pin blocks, bevel gears on said adjusting screws, shafts mounted axially on the hubs of said thrust cranks, bevel gears on the forward ends of said shafts meshing with the bevel gears on the adjusting screws, gears on the rear ends of said shafts meshing with an idler concentric with the power shaft, said idler, means for turning said idler manually, and means for rotating the thrust cranks by the rotation of the lathe head, for the purpose described.

15. In a lathe head of the character designated, the combination with the power shaft of a double cross head secured rigidly to the power shaft and formed with two sets of radial arms, one set at right angles to the other, two opposed counterweight slides mounted upon the forward set of said radial arms, two thrust cranks mounted upon the other set of said radial arms, wrist pins on the crank arms engaging slide blocks resting between transverse ways on the said counterweight slides, adjusting screws upon the crank arms engaging the wrist pin blocks, bevel gears on said adjusting screws, shafts mounted axially in the hubs of said thrust cranks, bevel gears on the forward ends of said shafts meshing with the bevel gears on the adjusting screws, gears on the rear ends of said shafts meshing with an idler concentric with the power shaft, said idler, a setting wheel engaging therewith, a bevel gear on the shaft of said setting gear engaging with a bevel gear on a hand-manipulated shaft, and said hand-manipulated shaft and bevel gear, for the purpose described.

KARL WILHELM ROCKENHAUSER.
HENRY F. FISCHER.

Witnesses:
FRED REES,
FRANK H. MOUSEES.